(12) United States Patent
McRoberts

(10) Patent No.: US 10,106,202 B1
(45) Date of Patent: Oct. 23, 2018

(54) REAR FENDER MOUNTING BRACKET SYSTEM FOR SEMI-TRUCK

(71) Applicant: Leroy McRoberts, Sergeant Bluff, IA (US)

(72) Inventor: Leroy McRoberts, Sergeant Bluff, IA (US)

( * ) Notice: Subject to any disclaimer, the term of this patent is extended or adjusted under 35 U.S.C. 154(b) by 0 days.

(21) Appl. No.: 15/911,451

(22) Filed: Mar. 5, 2018

Related U.S. Application Data

(60) Provisional application No. 62/540,159, filed on Aug. 2, 2017.

(51) Int. Cl.
*B62D 25/18* (2006.01)
*B62D 25/16* (2006.01)

(52) U.S. Cl.
CPC ......... *B62D 25/166* (2013.01); *B62D 25/168* (2013.01)

(58) Field of Classification Search
CPC .. B62D 25/163; B62D 25/166; B62D 25/168; B62D 25/18; B62D 25/186
See application file for complete search history.

(56) References Cited

U.S. PATENT DOCUMENTS

| | | | | |
|---|---|---|---|---|
| 5,950,975 A * | 9/1999 | Zieske | ................. | B62D 25/168 248/291.1 |
| 6,802,517 B1 * | 10/2004 | Wuthrich | ............... | B62D 25/18 280/157 |
| 8,388,003 B2 * | 3/2013 | Wellman | ............. | B62D 25/186 280/157 |
| 8,757,707 B2 * | 6/2014 | Hamasaki | ............ | B62D 25/161 16/270 |
| 8,882,121 B2 * | 11/2014 | Ducroquet | ........... | B62D 25/163 280/157 |
| 2006/0108765 A1 * | 5/2006 | Teich | ................... | B62D 25/186 280/157 |
| 2015/0232137 A1 * | 8/2015 | Butler | ................. | B62D 35/008 296/180.5 |
| 2015/0299982 A1 * | 10/2015 | Angelo | ................. | E02F 9/0858 29/428 |

* cited by examiner

*Primary Examiner* — Brian L Swenson
(74) *Attorney, Agent, or Firm* — Dale J. Ream

(57) ABSTRACT

A mounting bracket system for mounting rear fenders to a semi-truck includes a front mounting bracket, a rear mounting bracket, and a fender support member. The mounting brackets include a combination of planar sections, sloped bridge sections interconnecting the planar sections, and interconnecting gussets for support and durability.

9 Claims, 19 Drawing Sheets

# REAR FENDER MOUNTING BRACKET SYSTEM FOR SEMI-TRUCK

REFERENCE TO RELATED APPLICATIONS

This application claims the benefit of provisional patent application U.S. Ser. No. 62/540,159 filed Aug. 2, 2017 titled Rear Fender Mounting Bracket System for Semi-Truck and which is incorporated herein by reference.

BACKGROUND OF THE INVENTION

This invention relates generally to truck fenders and, more particularly, to a system of mounting brackets specifically for mounting a fender to the rear suspension of a semi-truck.

Semi-truck fenders provide a shield in close proximity above, in front of, or behind the rear tires of a semi-truck so as to shield the truck itself, other vehicles, and people from debris and spray from rain that may get churned up into the air by the rotation of the tires. A full fender set may extend almost to the road surface behind and almost to the road surface in front of one or both tires of the truck. Mounting such fenders to a semi-truck, however, can be a major challenge in that there is limited frame structure on a semi-truck to which the fenders themselves may be mounted.

Therefore, it would be desirable to have a bracket system that enables a half or full semi-truck fender set to be mounted to the semi-truck suspension.

SUMMARY OF THE INVENTION

Therefore, a general object of this invention is to provide a bracket system for mounting a fender to the suspension of a semi-truck.

Another object of this invention is to provide a bracket system, as aforesaid, that is easy to install, durable, and inexpensive.

Still another object of this invention is to provide a bracket system, as aforesaid, having a front mounting bracket and a rear mounting bracket that, together, mount to the frame of a semi-truck and that support one or more fender panels over the combination of rear tires and wheels of the truck.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is a sectional view taken along line 4b-4b of FIG. 4a;

FIG. 8b is a sectional view taken along line 8b-8b of FIG. 8a;

FIG. 12b is a sectional view taken along line 12b-12b of FIG. 12a;

FIG. 16b is a sectional view taken along line 16b-16b of FIG. 16a;

FIG. 24b is an isolated view on an enlarged scale taken from FIG. 24a;

FIG. 24c is an isolated view on an enlarged scale taken from FIG. 24a.

DESCRIPTION OF THE PREFERRED EMBODIMENT

Figure 1:
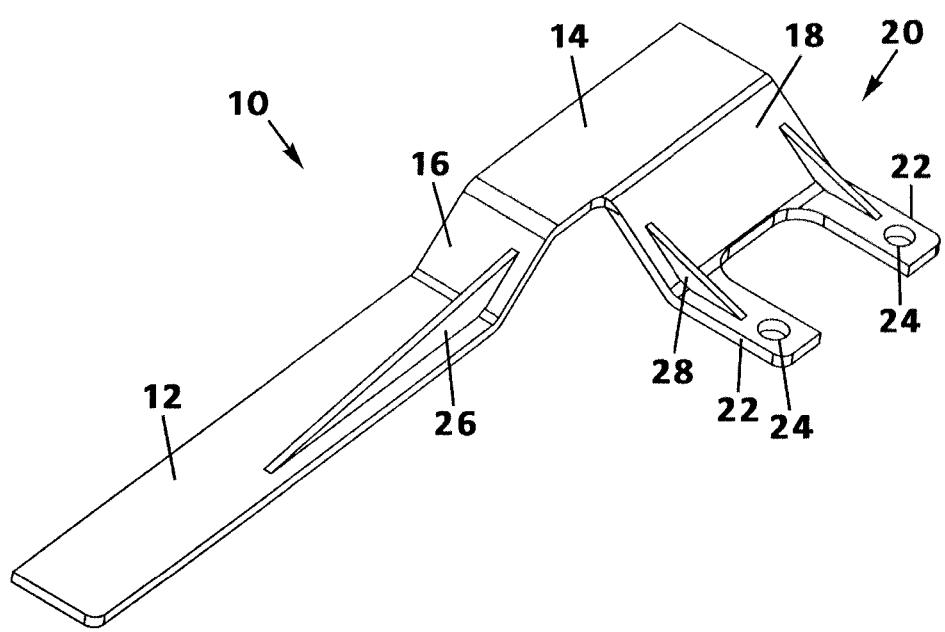
FIG. 1 is a front mounting bracket of a fender mounting system according to a preferred embodiment of the present invention.
Figure 2:
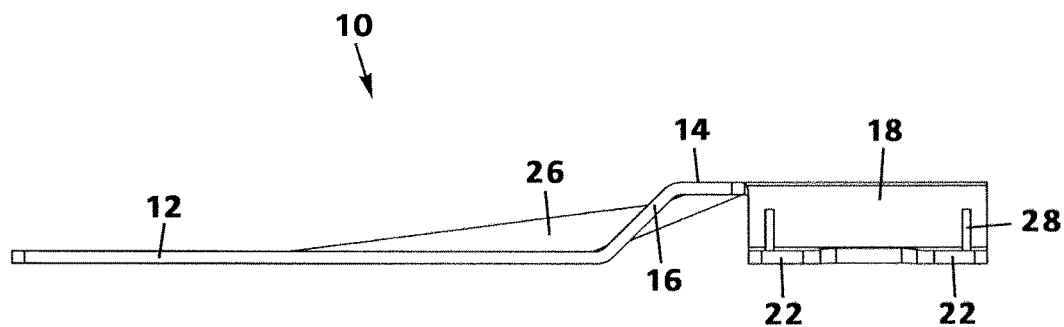
FIG. 2 is a side view of the front mounting bracket as in FIG. 1.
Figure 3:
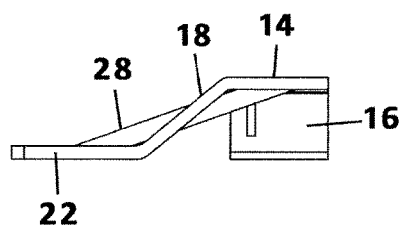
FIG. 3 is an end view of the front mounting bracket as in FIG. 1.
Figure 4A:
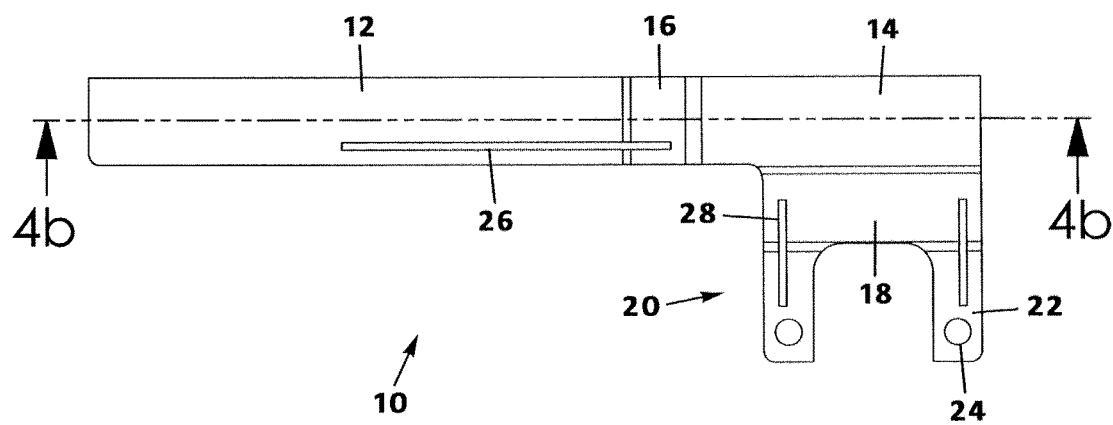
FIG. 4a is a top view of the front mounting bracket as in FIG. 1.
Figure 4B:
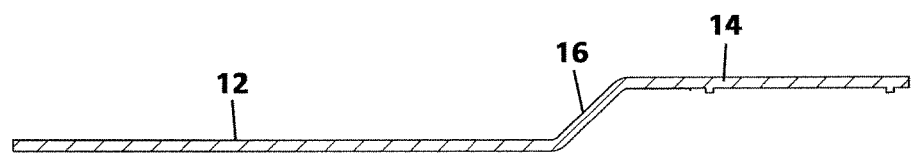
Figure 5:
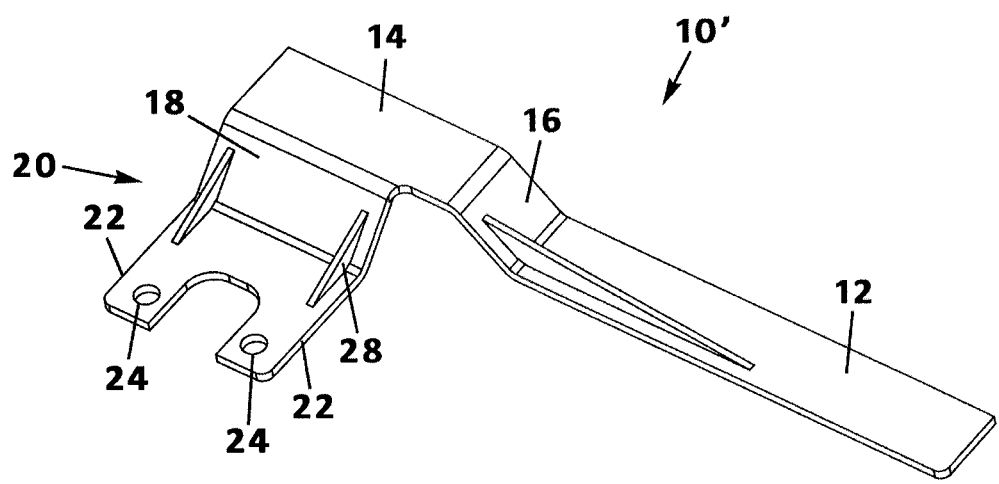
FIG. 5 is a front mounting bracket of a fender mounting system illustrated from a reverse but otherwise mirror image of FIG. 1.
Figure 6:
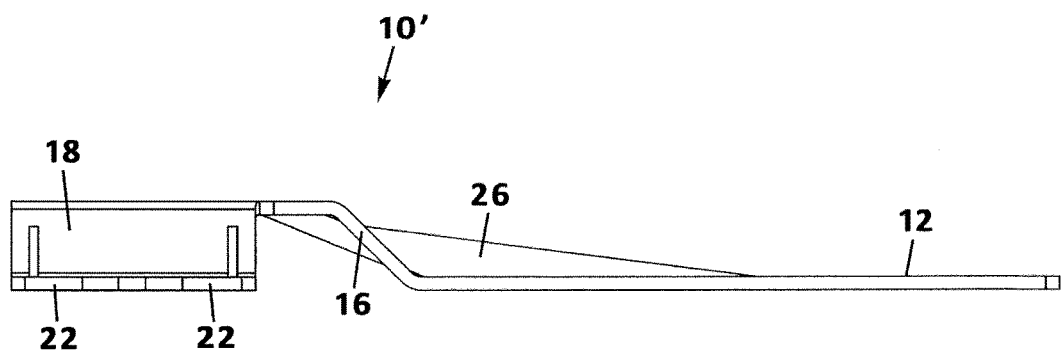
FIG. 6 is a side view of the front mounting bracket as in FIG. 5.
Figure 7:
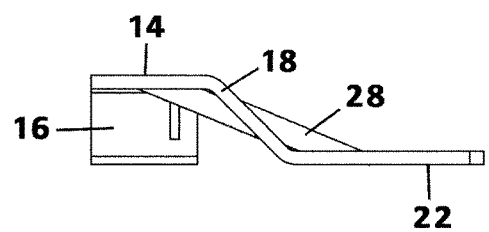
FIG. 7 is an end view of the front mounting bracket as in FIG. 5.
Figure 8A:
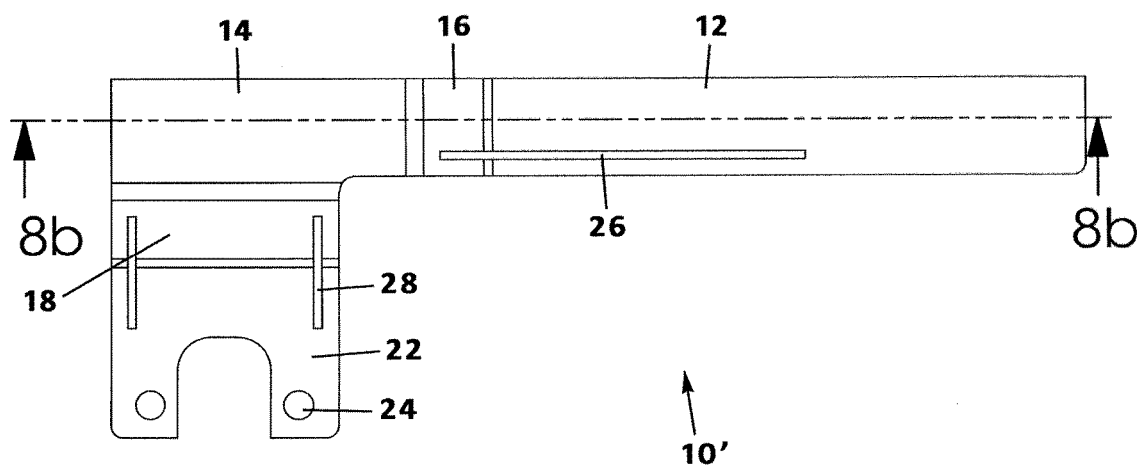
FIG. 8a is a top view of the front mounting bracket as in FIG. 5.
Figure 8B:
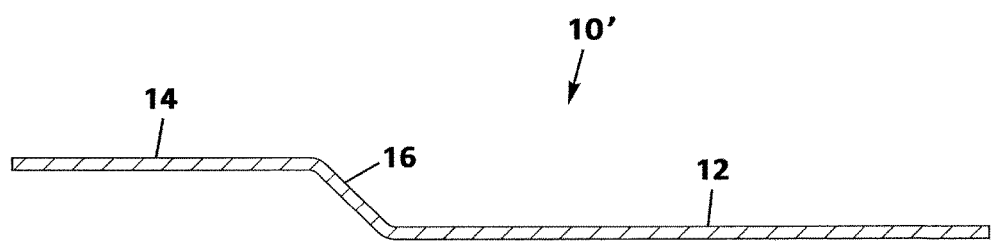
Figure 9:
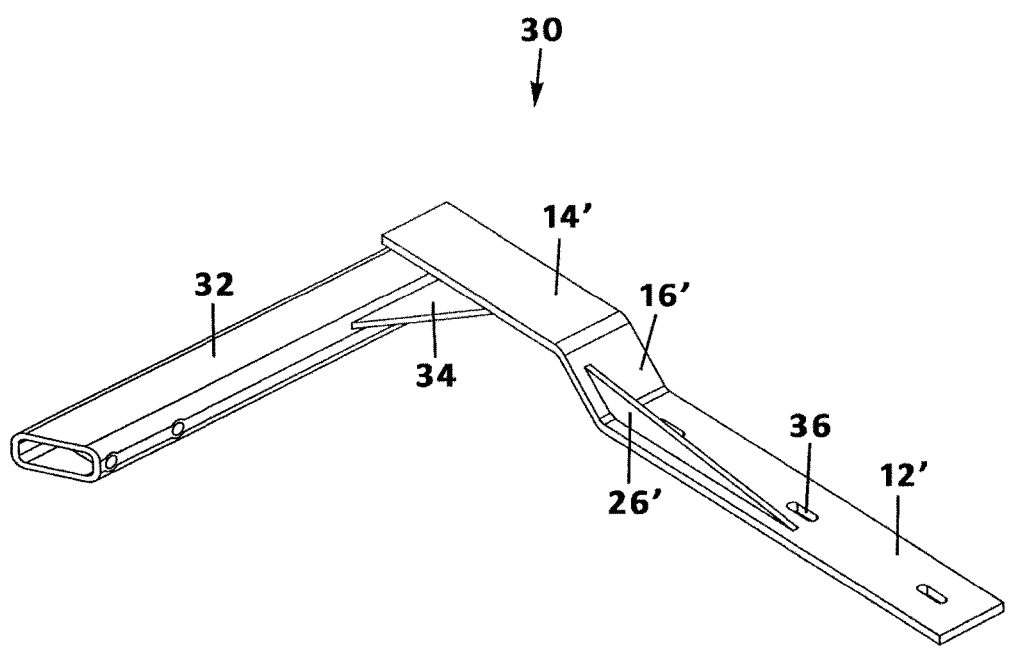
FIG. 9 is a front mounting bracket of the fender mounting system according to another embodiment of the present invention.
Figure 10:
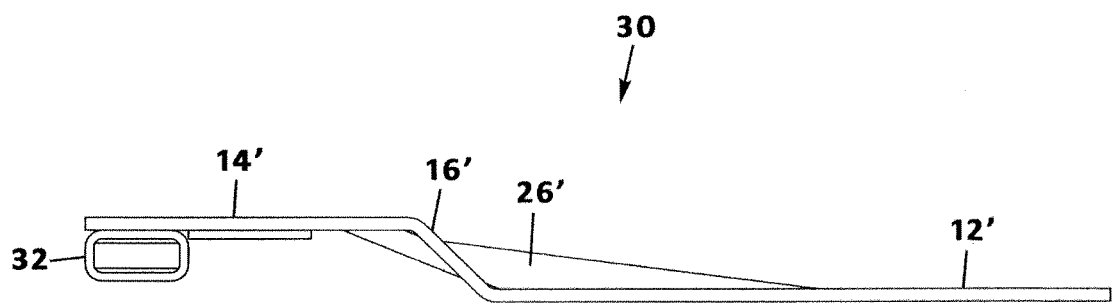
FIG. 10 is a side view of the front mounting bracket as in FIG. 9.
Figure 11:
FIG. 11 is an end view of the front mounting bracket as in FIG. 9.

A mounting bracket system according to the present invention for mounting rear fenders to a semi-truck will now be described in detail with reference to FIGS. 1 to 24c of the accompanying drawings.

It will be understood that there will be some variation in the mounting brackets, depending on if they are mounted on the drivers' side versus passenger side and to the suspension versus other frame portion. In addition, there may be variations depending on the make and model of the truck to which they are intended to be mounted.

A front bracket 10 is shown in FIGS. 1 to 4b and includes a first section 12 having an elongate, linear, and planar configuration. A second section 14 also includes a linear and planar configuration and is parallel with and displaced downstream from the first section 12, the first and second sections being connected by an upwardly inclined first bridge section 16 intermediate the first and second sections. Preferably, the first and second sections are arranged in a longitudinal and linear manner, such as with a distal end of the first section 12 being coupled to a proximal end of the second section 14 by the upwardly inclined first bridge section 16. The second section 14 includes a length smaller than a length of the first section. The second section 14 is parallel to the first section 12 but at a higher plane due to the inclined first bridge section 16 connecting them.

In generic language, a mounting extension portion 20 extends laterally from a side edge of the second section. The mounting extension portion 20 may include variations in structure as described below and shown in the figures.

In an embodiment, the mounting extension portion 20 includes a pair of spaced apart arms 22 extending laterally away from a side edge of the second section 14, the side arms 22 being connected to the second section 14 via a downwardly sloping second bridge section 18. Preferably, each arm will have a planar configuration displaced from an opposite arm of a pair of arms. Each arm 22 defines a first aperture 24 for receiving a mounting bolt therethrough so as to couple the front bracket 10 to the frame of the semi-truck. The side arms 22 are parallel to one another but perpendicular to the first section 12 and second section 14.

A first gusset 26 is coupled to the first section 12 and to the inclined first bridge section 16, respectively, the first gusset 26 extending upwardly (vertically) and has a planar configuration defining a vertical plane perpendicular to the first section 12. A second gusset 28 is coupled to each arm 22 of the pair of arms, respectively, and to the sloping second bridge section 18. The second gusset 28 extends upwardly (vertically) and has a planar configuration defining a vertical plane perpendicular to the horizontal plane defined by the pair of arms 22. The gussets provide strength and durability to the front bracket 10.

The mounting extension portion 20 may be coupled to a frame of the semi-truck. More particularly, the mounting extension portion 20, namely the side arms 22, may define the aperture described above through which bolts may be inserted to mount the front bracket 10 to a front frame portion of the semi-truck in a position that enables the second section to support a fender attachment thereon proximate a respective tire-wheel combination of the semi-truck.

FIGS. 5 to 8a illustrate a front bracket 10' a mirror image of the front bracket 10 as shown in FIGS. 1 to 4b described above. It is understood that the front bracket 10 first described above may be intended for installation on a right side semi-truck fender while the front bracket 10' shown in FIGS. 5 to 8a is intended for installation on a left side semi-truck fender or vice versa. The structures and functions thereof are substantially the same as those described above and the same reference numerals are to identify the structures in the drawings.

FIGS. 9 to 12b show an auxiliary bracket 30 having a configuration substantially similar to the first bracket 10 described above except as specifically noted below. Similar structures are shown in primed numerals. Namely, there is a first section 12' (which may also be referred to as a fender bracket bar) and a second section 14' arranged in linear alignment and having planar configurations, the first and second sections being connected by a first bridge portion 16' that is upwardly inclined. A first gusset 26' may extend upwardly from and be in contact with both the first section 12' and the first bridge portion 16' for strength purposes. The first section 12' may define spaced apart slots 36 or apertures configured to receive fasteners therethrough, such as for mounting a fender panel thereto. In this embodiment, the mounting extension portion 20 includes a bracket mounting tube 32 attached at a right angle to the second section 14' in an arrangement similar to the pair of arms 22 described previously. The bracket mounting tube 32 may define an interior space. An auxiliary gusset 34 may be coupled to the bracket mounting tube 32 and the second section 14' of the linear mounting sections for additional strength and durability.

Figure 12A:
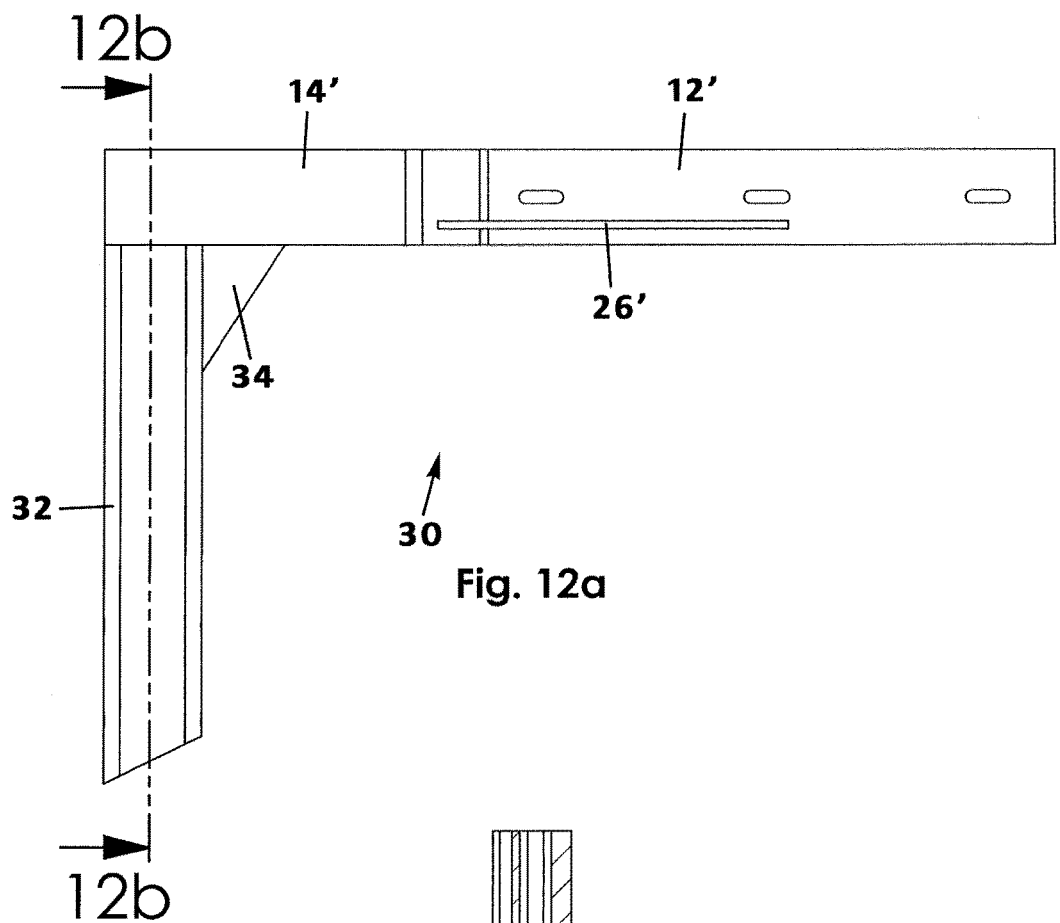
FIG. 12a is a top view of the front mounting bracket as in FIG. 9.
Figure 12B:
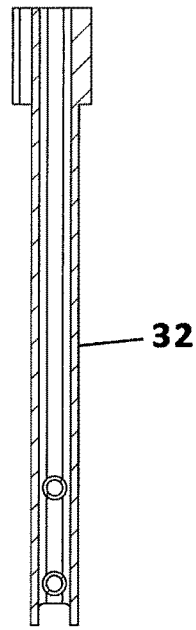
Figure 13:
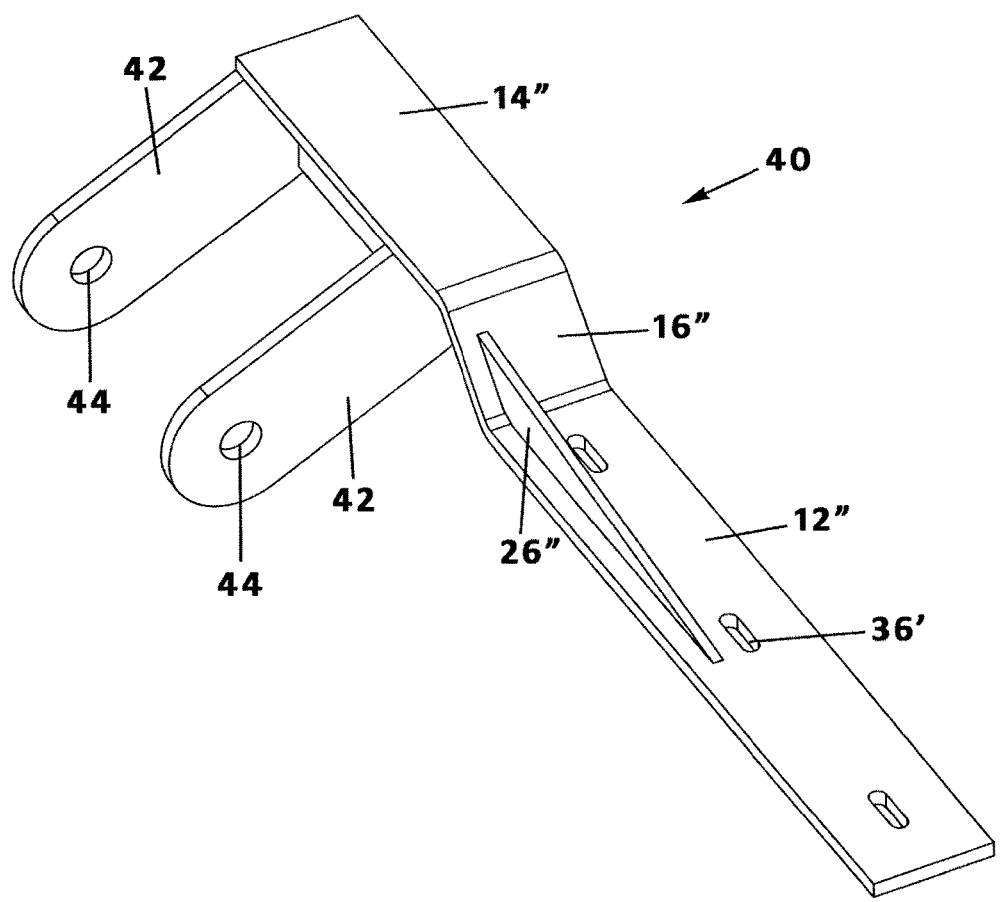
FIG. 13 is a front mounting bracket of the fender mounting system according to another embodiment of the present invention.
Figure 14:
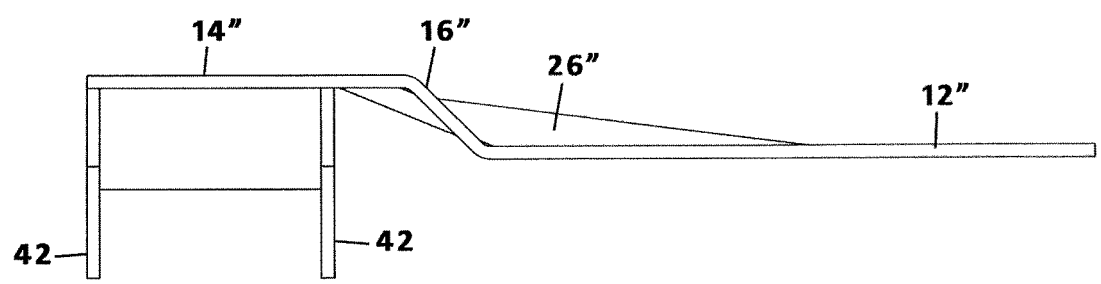
FIG. 14 is a side view of the front mounting bracket as in FIG. 13.
Figure 15:
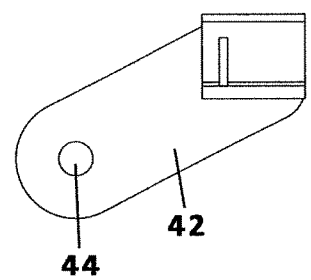
FIG. 15 is an end view of the front mounting bracket as in FIG. 13.
Figure 16A:
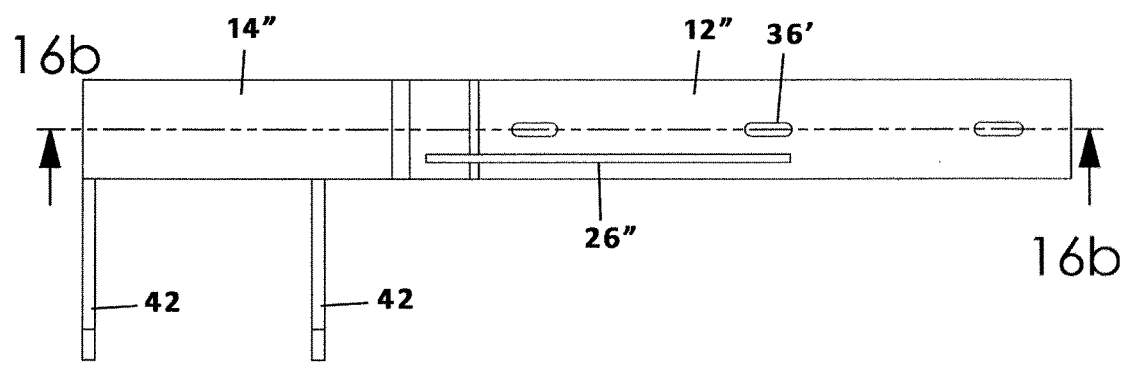
FIG. 16a is a top view of the front mounting bracket as in FIG. 13.
Figure 16B:
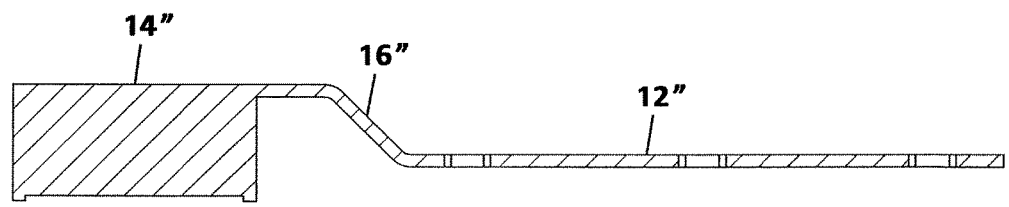

FIGS. 13 to 16b illustrate another fender bracket 40, also having a fender bracket bar, and having a configuration that is substantially similar to the bracket shown in FIG. 12 and the bracket shown in FIG. 1 except as otherwise described below. Similar structures are shown in primed numerals, such as first section 12", a second section 14", mounting slots 36", and a first bridge portion 16". The mounting extension portion 20 includes a pair of downwardly sloping lugs 42, each defining a mounting aperture 44 configured to receive a fastener. The lugs 42 that slope downwardly and laterally away from the second section 14" may be a pair of lugs spaced apart from one another and extending laterally away from opposed ends of the second section 14". The first section 12" may include a first gusset 26" as described above as well as defining a mounting slots 36'.

Next, FIGS. 17 to 22 illustrate a rear mounting bracket 50 according to the present invention, including an adjustable angle fender mounting member atop which the rear portion of an actual fender panel can be mounted. It should be appreciated that the rear mounting bracket 50 is a critical component of the present invention and is to be installed along with the front mounting bracket 10 described above.

Figure 17:
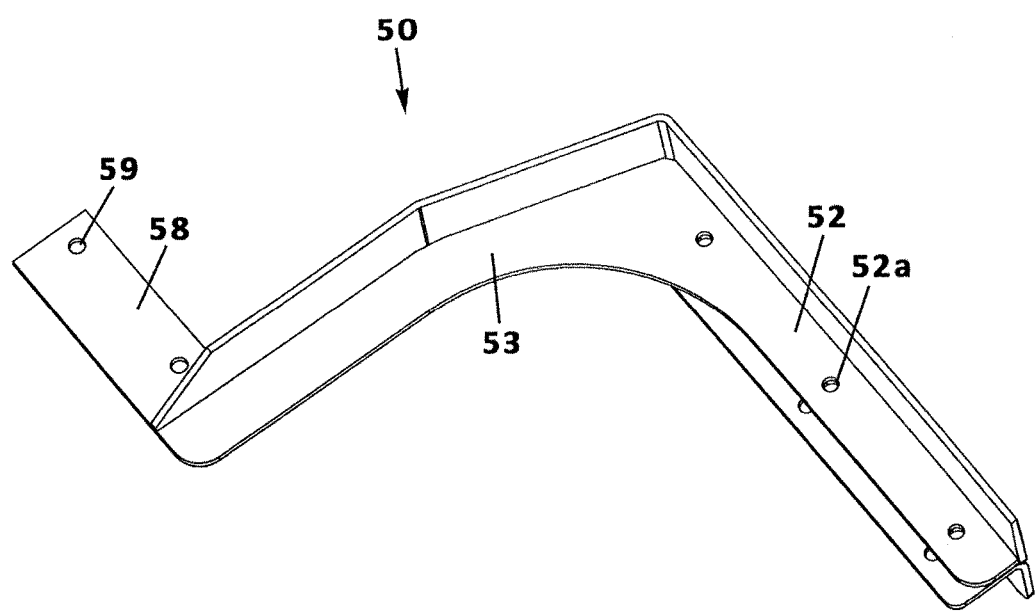
FIG. 17 is a perspective view of a rear mounting bracket of the fender mounting system according to the present invention.
Figure 18:
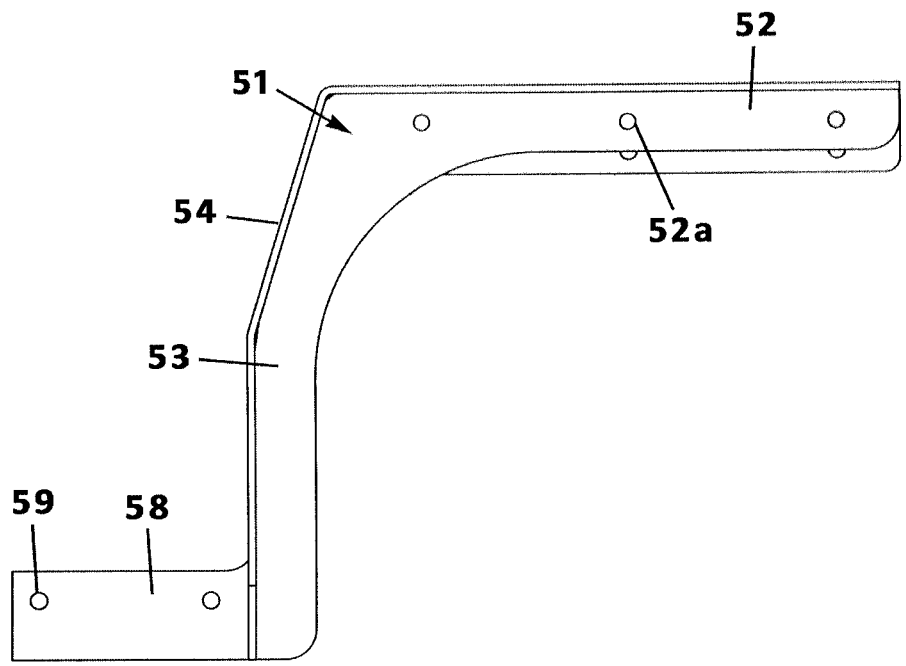
FIG. 18 is a first side view of the rear mounting bracket as in FIG. 17.
Figure 19:
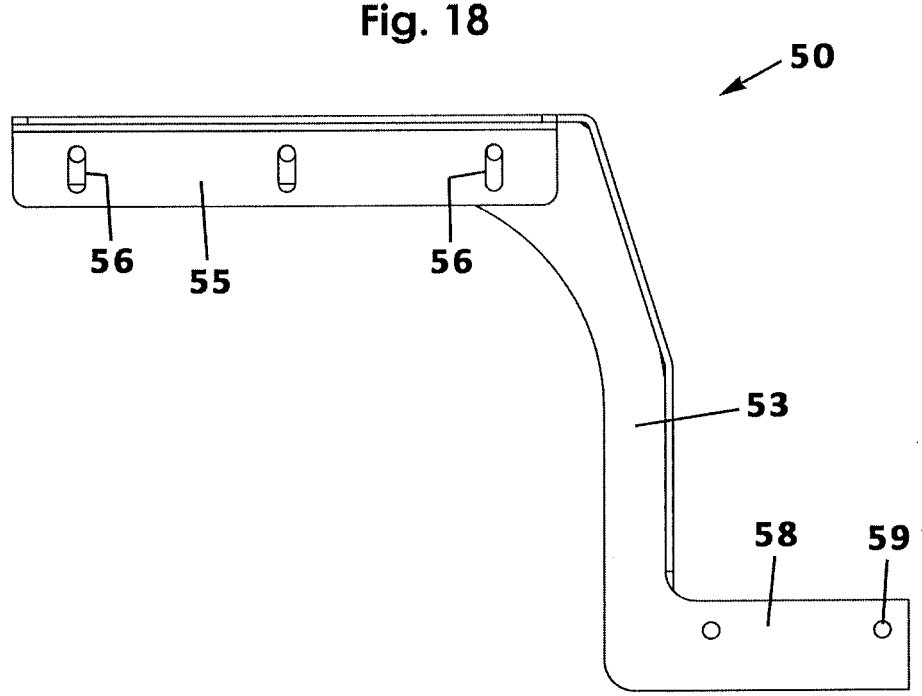
FIG. 19 is a second side view of the rear mounting bracket as in FIG. 17.
Figure 20:
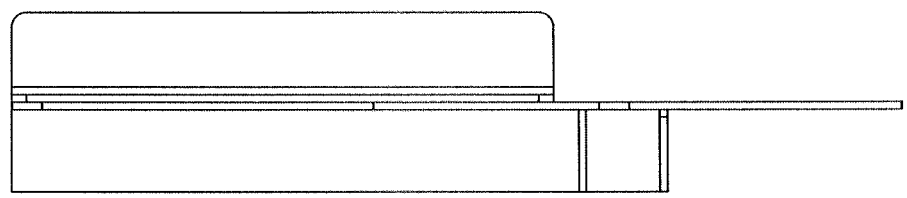
FIG. 20 is an end view of the rear mounting bracket as in FIG. 17.
Figure 21:
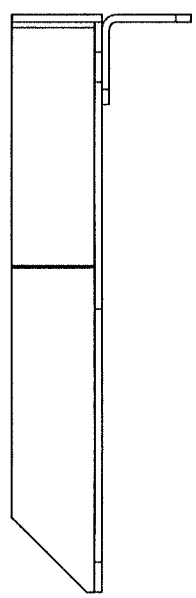
FIG. 21 is another end view of the rear mounting bracket as in FIG. 17.
Figure 22:
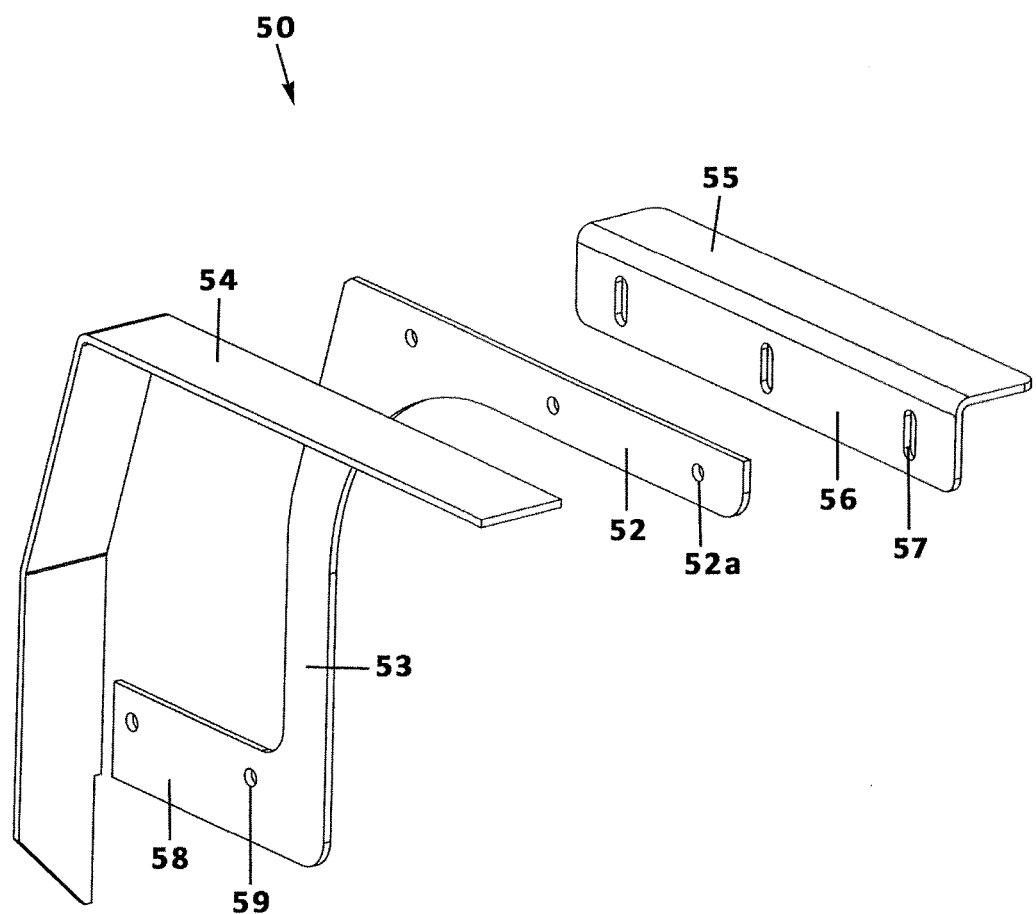
FIG. 22 is an exploded view of the rear mounting bracket as in FIG. 17.
Figure 23:
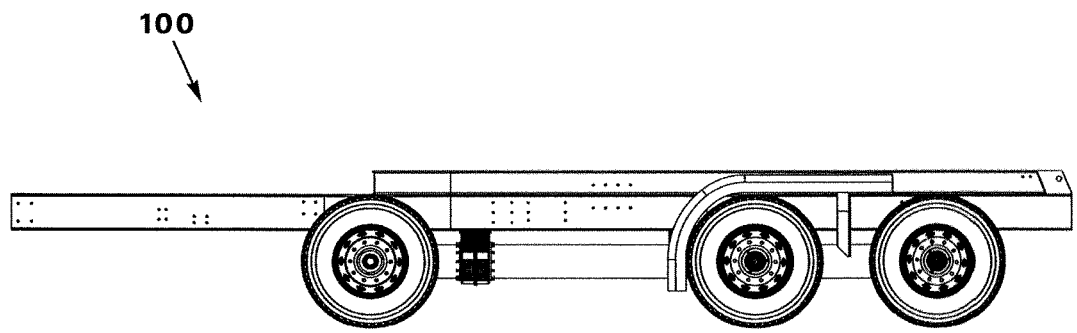
FIG. 23 is a side view of a chassis or frame of a semi-truck cab.
Figure 24:
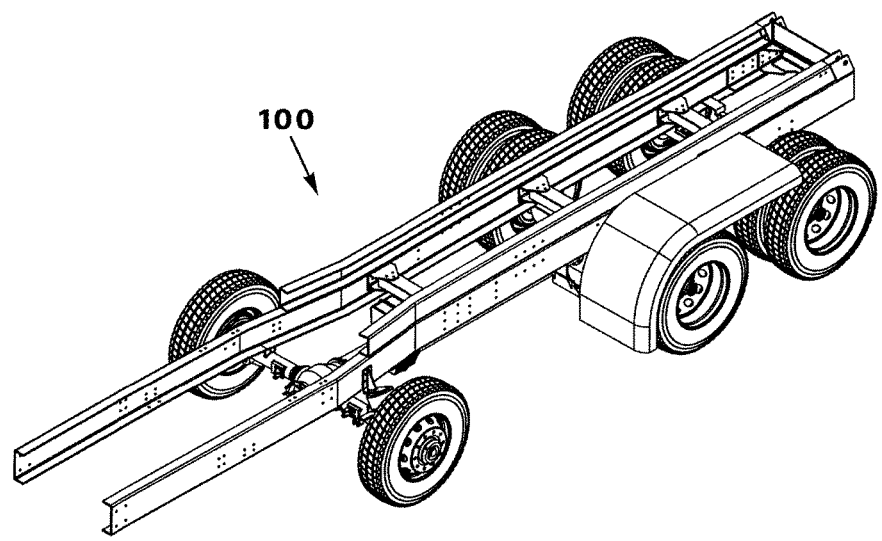
FIG. 24 is a perspective view of the frame as in FIG. 23.
Figure 24A:
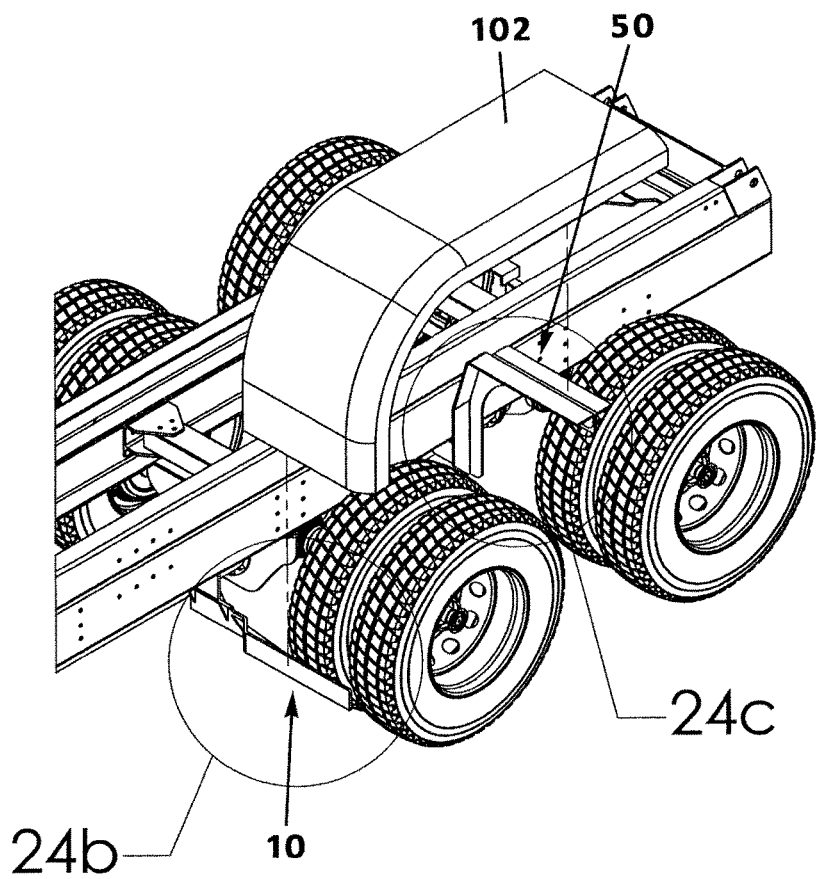
FIG. 24a is a partial view of the frame as in FIG. 24 illustrated with a front bracket and rear bracket coupled to the frame and with a fender exploded for clarity.
Figure 24B:
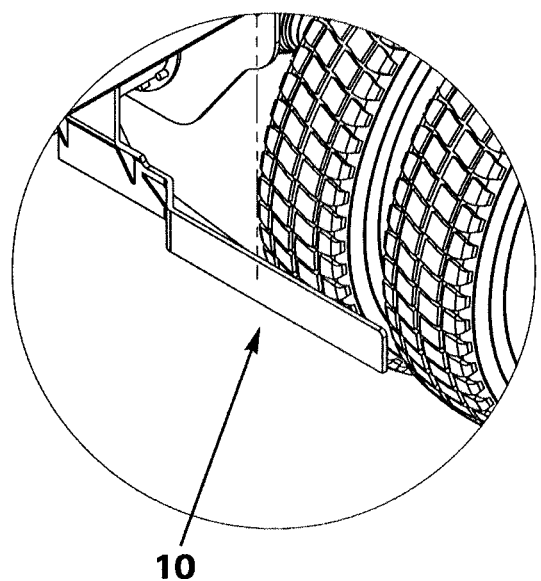
Figure 24C:
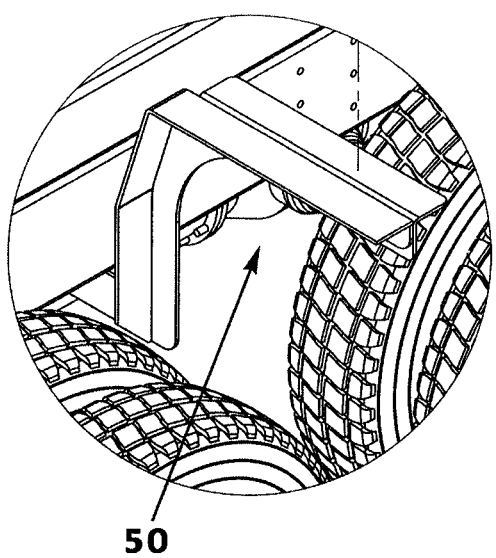

First, the rear mounting bracket 50 may include a fender mounting member 51 having an L-shaped and planar configuration. An upper portion 52 of the fender mounting member 51 defines a plurality of holes 52a spaced apart from one another. A lower portion 53 is perpendicular to the upper portion 52, the upper and lower portions forming the L-shaped configuration described above. A lip member 54 perpendicular to the planar configuration of the fender mounting member 51 extends away from an edge of the fender mounting member 51. It is understood that the fender mounting member 51 may be constructed of angle iron to provide the described configuration as shown in FIGS. 17 and 22.

The rear mounting bracket 50 may include an auxiliary mounting member 55 also having an L-shaped configuration that is coupled to an upper portion 52 of the fender mounting member 51, the auxiliary mounting member 55 defining a plurality of slots 56 spaced apart from one another. The auxiliary mounting member 55 may be referred to as an adjustable angle bracket. Preferably, the auxiliary mounting member 55 is coupled to the fender mounting member 51 with fasteners inserted through corresponding slots 56 and holes 59, it being understood that the position of the auxiliary mounting member 55 may be adjustable.

The fender mounting member 51 includes a mounting arm 58 attached to a distal or lower end of the lower portion 53 of the fender mounting member 51 and extends away therefrom. In other words, the mounting arm 58 is perpendicular to the lower portion 53 and parallel to the upper portion 52 and continues in the direction defined by the upper portion. The mounting arm 58 may define one or a plurality of holes 59' for receiving respective fasteners (not shown) for securing the mounting arm 58 to the frame.

In use, the front bracket 10 may be coupled to the framework 100 of a semi-truck in proximity to the tire-wheel combinations. Specifically, respective fasteners, such as bolts, may be received through apertures 24 of respective structures of the mounting extension portion 20 as described above. A fender panel 102 may then be supported upon or coupled to first or second sections of the front bracket sections. Similarly, the mounting arm 58 of a rear mounting bracket 50 may be coupled to the framework 100 of a semi-truck in proximity to the tire-wheel combinations. Then, respective fasteners may be received through respective slots 56 of the auxiliary mounting member 55 for supporting a fender panel 102 thereon.

It is understood that while certain forms of this invention have been illustrated and described, it is not limited thereto except insofar as such limitations are included in the following claims and allowable functional equivalents thereof.

The invention claimed is:

1. A fender mounting bracket system for mounting a fender proximate a frame of a semi-truck, comprising:
   a front mounting bracket comprising:
      a first section having an elongate, linear, and planar configuration;
      a second section having a linear and planar configuration that has a length that is less than a length of said first section;
      wherein said second section is displaced longitudinally from and parallel to said first section;
      a first bridge section positioned to connect a distal end of said first section to a proximal end of said second section, said first bridge portion having an upwardly sloped configuration;
      a mounting extension portion extending away from an interior edge of said second section and configured for attachment to the frame of the semi-truck, said mounting extension portion being perpendicular to said first section and said second section;
      wherein said mounting extension portion includes a bracket mounting tube coupled to and extending laterally away from a distal end and side edge of said second section, said bracket mounting tube defining an open interior space;
      wherein said first section defines a plurality of slots spaced apart from one another and configured to receive fasteners therethrough, respectively.

2. The fender mounting system as in claim 1, wherein said mounting extension portion includes:
   a pair of arms, each arm being spaced apart from another arm and having a planar configuration laterally extending away from said second section;
   a second bridge section intermediate and connecting said second section and said pair of arms, said second bridge section having a downwardly sloping configuration from said second section toward said pair of arms.

3. The fender mounting system as in claim 2, wherein said front mounting bracket includes a first gusset having a planar and upstanding configuration extending upwardly from a top surface of said first section, said first gusset being coupled at one end to said first section and at an opposed end to said first bridge section for increasing a durability of said first section and said first bridge section.

4. The fender mounting system as in claim 3, wherein said front mounting bracket includes further comprising a second gusset having a planar and upstanding configuration extending upwardly from a top surface of each arm of said pair of arms, respectively, a respective second gusset being coupled at one end to a respective arm and at another end to said second bridge section for increasing a durability of the second bridge section and said pair of arms.

5. The fender mounting system as in claim 1, wherein said front mounting bracket includes a first gusset having a planar and upstanding configuration extending upwardly from a top surface of said first section, said first gusset being coupled at one end to said first section and at an opposed end to said first bridge section for increasing a durability of said first section and said first bridge section.

6. The fender mounting system as in claim 1, wherein said front mounting bracket includes an auxiliary gusset that is co-planar or parallel with said second section and coupled to said second section and to said bracket mounting tube, said auxiliary gusset increasing a durability of said second section and said bracket mounting tube.

7. A fender mounting bracket system for mounting a fender proximate a frame of a semi-truck, comprising:
   a front mounting bracket comprising:
      a first section having an elongate, linear, and planar configuration;
      a second section having a linear and planar configuration that has a length that is less than a length of said first section;
      wherein said second section is displaced longitudinally from and parallel to said first section;
      a first bridge section positioned to connect a distal end of said first section to a proximal end of said second section, said first bridge portion having an upwardly sloped configuration;
      a mounting extension portion extending away from an interior edge of said second section and configured for attachment to the frame of the semi-truck, said mounting extension portion being perpendicular to said first section and said second section;
      wherein said mounting extension portion includes a pair of mounting lug members, each mounting lug member being spaced apart from any other mounting lug member and having an upstanding planar configuration laterally extending away from said second section in a downwardly sloping configuration;
      wherein said front mounting bracket includes a first gusset having a planar and upstanding configuration extending upwardly from a top surface of said first section, said first gusset being coupled at one end to said first section and at an opposed end to said first bridge section for increasing a durability of said first section and said first bridge section;
      wherein said first section defines a plurality of slots spaced apart from one another and configured to receive fasteners therethrough, respectively.

8. A fender mounting bracket system for mounting a fender proximate a frame of a semi-truck, comprising:
   a front mounting bracket comprising:
      a first section having an elongate, linear, and planar configuration;
      a second section having a linear and planar configuration that has a length that is less than a length of said first section;
      wherein said second section is displaced longitudinally from and parallel to said first section;
      a first bridge section positioned to connect a distal end of said first section to a proximal end of said second section, said first bridge portion having an upwardly sloped configuration;

a mounting extension portion extending away from an interior edge of said second section and configured for attachment to the frame of the semi-truck, said mounting extension portion being perpendicular to said first section and said second section;

a rear mounting bracket, comprising:

a fender mounting member that includes an upper portion having a planar configuration and a lower portion having a planar configuration extending downwardly from an end of said upper portion, said upper and lower portions, together, giving said fender mounting member an L-shaped configuration;

an auxiliary mounting member having an L-shaped configuration selectively coupled to said upper portion of said fender mounting member, said auxiliary mounting member defining a plurality of spaced apart slots;

a mounting arm connected to a distal end of said lower portion of said fender mounting member and that extends away and perpendicular to said lower portion, said mounting arm defining at least one hole for receiving a fastener for attaching said rear mounting bracket to the frame of the semi-truck.

9. The fender mounting system as in claim 8, wherein said upper portion defines spaced apart holes for receiving fasteners selectively coupling said auxiliary mounting member to said upper portion of said fender mounting member.

* * * * *